United States Patent [19]

Anthony

[11] Patent Number: 4,893,975
[45] Date of Patent: Jan. 16, 1990

[54] LOCKING DEVICE FOR ENGAGEMENT ONTO BOLT HEADS

[75] Inventor: William M. Anthony, Scottsdale, Ariz.

[73] Assignee: Allied-Signal Inc., Phoenix, Ariz.

[21] Appl. No.: 268,312

[22] Filed: Nov. 7, 1988

[51] Int. Cl.$^4$ .................. F16B 39/02; F16B 39/04
[52] U.S. Cl. .................................. 411/87; 411/92; 411/95
[58] Field of Search ............ 411/87, 90, 91, 92, 411/95, 96, 99, 513, 514, 97

[56] References Cited

U.S. PATENT DOCUMENTS

| | | | |
|---|---|---|---|
| 132,867 | 11/1872 | Smith | 411/99 |
| 382,789 | 5/1888 | Benton. | |
| 571,661 | 11/1896 | Hand | 411/96 |
| 756,423 | 4/1904 | Smith | 411/95 |
| 1,136,234 | 4/1915 | Johnson et al. | 411/91 |
| 1,487,225 | 3/1924 | Fiehler | 411/91 |
| 2,385,777 | 10/1945 | Ebert. | |
| 2,421,201 | 5/1947 | Hallock. | |
| 2,424,521 | 7/1947 | Utsch. | |
| 2,620,008 | 12/1952 | Mallard. | |
| 2,758,628 | 8/1956 | Rice | 411/87 |
| 2,783,674 | 3/1957 | Becker. | |
| 3,192,735 | 7/1965 | Bernhard. | |
| 3,467,417 | 9/1969 | Ollis, Jr. et al.. | |
| 4,298,299 | 11/1981 | Quarles | 411/514 |

Primary Examiner—Neill R. Wilson
Attorney, Agent, or Firm—Terry L. Miller; James W. McFarland

[57] ABSTRACT

A locking device for threaded fasteners includes a unitary flexibly shape-retaining body having portions non-rotatably engaging the heads of each of a pair of bolts, and a medial interconnecting bar portion which mutually prevents rotation of the portions and of the engaged bolts, while also deformably allowing for variable spacing between the pair of bolts to be accommodated. A resilient retainer pin removably secures the locking device to each bolt head. The locking device may be reused many times without detriment to its locking function.

13 Claims, 1 Drawing Sheet

LOCKING DEVICE FOR ENGAGEMENT ONTO BOLT HEADS

TECHNICAL FIELD

The present invention is in the field of locking devices for threaded fasteners. Particularly, the present invention is in the field of fastener locking devices applicable to combustion turbine engines in aerospace uses.

BACKGROUND ART

In the aerospace field it is ordinary for combustion turbine engines employed for aircraft propulsion to be installed on the aircraft within aerodynamic nacelle structure. Consequently, access to the engine within the nacelle is restricted, and maintenance operations which easily could be performed on the engine apart from the aircraft are rendered difficult and time consuming because of limited access. One of these maintenance operations is the removal, inspection, and reinstallation of fuel nozzles. Because fuel nozzles of a combustion turbine engine extend into the combustion chamber and are exposed to considerable heat as well as the possibility of carbon deposit formation, their inspection on a regular schedule is one of the more frequent maintenance procedures. Also, because a defective or carbon fouled fuel nozzle can result in uneven fuel atomization and resulting combustion hot spots which could damage an engine, this maintenance procedure is vital to insuring proper service life for an engine.

Traditionally, because conventional fuel nozzles are secured to the outer casing of a turbine engine by bolts threading into the engine casing, the bolt heads have been cross drilled and aircraft safety wire installed to insure that the nozzles do not loosen between inspections. Conventional aircraft safety wiring practices are long established, low in material cost, and result in a very reliable mechanical installation which resists loosening of the nozzle bolts consequent to vibration from engine operation. However, safety wiring of bolts in the confines of an aircraft engine nacelle is very time consuming, high in labor cost, and is difficult because of the contortions required of the aircraft mechanic.

Thus, it has been recognized in the field that a substitute for safety wiring of inaccessible fasteners on aircraft is highly desirable. The requirements for such a safety wire substitute are simplicity, low cost, ease of use, and near-absolute reliability. Conventional fastener retention or locking expedients known to the applicant and which are possibly relevant to the present invention are set forth by the following United States patents:

| U.S. Pat. No. | Inventor Name | Issue Date |
|---|---|---|
| 382,789 | L. J. Benton | May 15, 1888 |
| 2,385,777 | J. F. Ebert | Oct. 2, 1945 |
| 2,421,201 | R. L. Hallock | May 27, 1947 |
| 2,424,521 | A. Utsch | July 22, 1947 |
| 2,758,628 | C. M. Rice | Aug. 14, 1956 |
| 2,620,008 | L. L. Mallard | Dec. 2, 1952 |
| 2,783,674 | P. D. Becker | March 5, 1957 |
| 3,467,417 | R. Ollis, Jr. et al | Sept. 16, 1969 |

Unfortunately, not one of these known fastener locking techniques is fully satisfactory. Some of these fastener locking schemes are too complex in their structure, or require specially configured fasteners, others would be difficult to use in a confined location, or cannot assure the near-absolute level of reliability required for aircraft use. Also, several of these conventional fastener locking expedients are too expensive to be viewed favorably as a substitute for the traditional low-cost safety wire method of locking fasteners.

DISCLOSURE OF THE INVENTION

A view of the deficiencies of the conventional fastener locking expedients are set out above. It is an object for this invention to provide a locking device applicable to two or more adjacent fasteners which is simple in its structure and low in cost, which is easy to use even in confined applications, and which has a reliability favorably comparable to traditional aircraft safety wire practices.

Accordingly, the present invention provides a substantially unitary and deformably shape retaining locking device for securing a plurality of threaded fasteners against inadvertent loosening relative rotation, said locking device comprising a plurality of apertured fastener-engaging portions matching in number with said plurality of fasteners and each non-rotatably engaging a respective head portion of one of said plurality of fasteners, a plurality of deformable interconnecting portions being one less in number than said plurality of fastener-engaging portions and extending between and integrally interconnecting adjacent ones of said plurality of fastener-engaging portions, deformation of said interconnecting portions changing the spacing between said adjacent fastener engaging portions, and means for removably securing said locking device in engagement with said plurality of fasteners.

An advantage of the present invention is that it is structurally straight forward or simple, while being inexpensive to manufacture. Thus, material cost for the present invention is very favorably comparable to traditional safety wire practice. In part, such low cost is attained because the locking device provided by this invention is durable and may be used many times without decrease of its locking reliability. The locking device provided by this invention is also easy to use even in confined locations. Thus, labor costs for use of this invention are considerably lower than conventional safety wire practice as applied within a confined area such as an engine nacelle. Even when applied in an easily accessible location, the present invention is so easy to use that labor time is less than for safety wiring of fasteners. Overall, considering both materials and labor costs, use of the present invention can be considerably less expensive than the long established and widely accepted safety wiring expedient.

Further to the above, the locking device according to the present invention provides a very high reliability. Such is the case because in the context of multiple fasteners each locking device is retained in engagement with each individual one of the fasteners which it locks. In the event that retention at one of the fasteners is lost, the device will ordinarily continue to be held in place because of its retention at the other fastener(s). Thus, locking action is not lost at any fastener unless a sufficient level of retention is lost to allow the device to disengage from one of the fasteners. Such an occurrence is very unlikely. In this respect, the locking device of the present invention has a level of retention redundancy about equal to the number of fasteners which it locks.

Additional objects and advantages of the present invention will appear from a reading of the following description of a single preferred embodiment of the invention, taken in conjunction with the appended drawing figures, of which:

BEST MODE OF CARRYING OUT THE INVENTION

Figure 1:
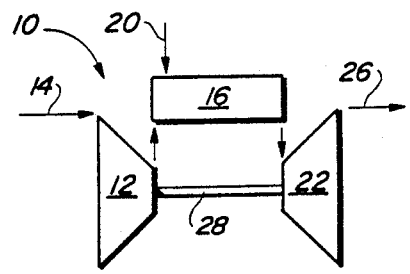
FIG. 1 schematically depicts a combustion turbine engine.

Referring to FIG. 1, a combustion turbine engine (10) is schematically depicted. The engine (10) includes a compressor (12) inducting ambient air as is depicted by arrow (14), and delivering this air pressurized to a combustor (16), as depicted by arrow (18). Within the combustor (16) fuel is added to the pressurized air, as indicated by arrow (20), to support combustion. A flow of high temperature pressurized combustion products flows from the combustor (16) to a turbine (22), as depicted by arrow (24). The turbine (22) expands the combustion products to ambient as depicted by arrow (26), and extracts mechanical power therefrom to drive the compressor (16) via an interconnecting rotatable shaft (28).

Figure 2:
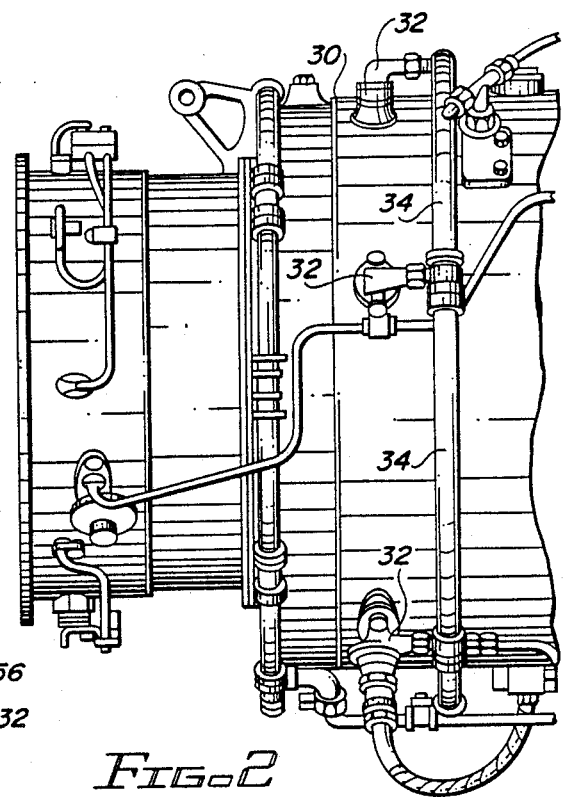
FIG. 2 presents a fragmentary view of the combustion turbine engine depicted by FIG. 1, and including the present invention.
Figure 3:
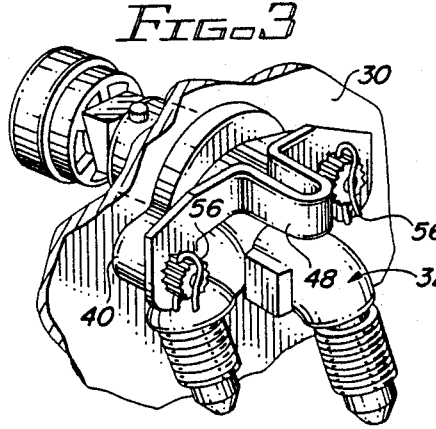
FIG. 3 provides a perspective view of a fuel nozzle secured by a pair of fasteners to an engine case, and locked by a locking device embodying the present invention.
Figure 4:
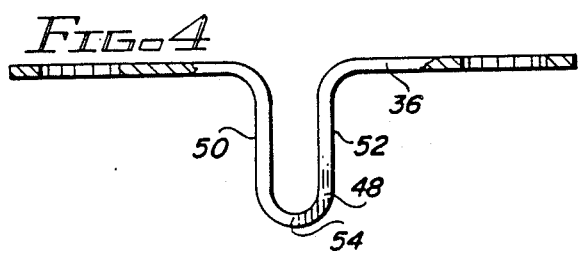
FIGS. 4 and 5, respectively, depict an elevation view and a plan view of a locking device embodying the present invention.
Figure 6:
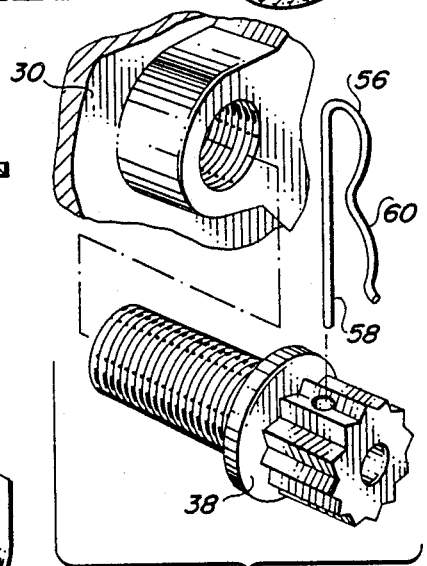
FIG. 6 presents a fragmentary perspective view of a threaded fastener threadably engageable with a receiving aperture, and a resilient retaining pin receivable by a head portion of the fastener.
Figure 5:
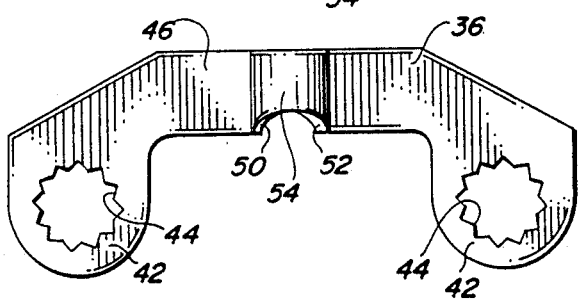

Viewing FIG. 2, which provides a fragmenting external view of the engine (10), it will be seen that the latter includes a generally cylindrical casing (30) to which are secured a plurality of fuel nozzles (32), only externally projecting portions of which are visible in FIG. 2. It will be understood that the nozzles (32) extend inwardly of casing (30) to deliver fuel to a combustion section (recalling FIG. 1, feature 16) within the engine. A circumferentially extending conduit (34) supplies fuel to each one of the nozzles (32) on casing (30).

FIGS. 3, 4, 5, and 6 in conjunction provide an enlarged view of a portion of FIG. 2 including one of the fuel nozzles (32) on casing (30), and views of a lock plate (36) embodying the present invention. It will be seen that the fuel nozzle (32) extends through an aperture (not visible in the drawing figures) of casing (30) and is secured thereto by a pair of threaded fasteners (38) (bolts) passing through apertured ear portions (40) of the nozzle (32) and threadably engaging the casing (30). While only the head portion of each fastener (38) is visible on FIG. 3, this construction is entirely conventional and should require no further explanation to those ordinarily skilled in the pertinent art. Particularly in FIG. 5, the relationship of the fasteners (38) to casing (30) is depicted. It will be seen that the heads of fasteners (38) are depicted as being of 12-point configuration and as being cross-drilled for safety wiring, both of which are common in the aerospace art.

However, the lock plate (36) defines a pair of spaced apart ear portions (42) which are both generally in the same plane and define apertures (44). The apertures (44) are of 12-point configuration to closely match with and interengage with the heads of fasteners (38). That is, the heads of fasteners (38) are nonrotatably received in the apertures (44) (viewing particularly FIG. 3). It will be easily understood that the complementary 12-point apertures (44) will also interengage with conventional hexagonal bolt heads. Alternatively, the bolt heads and apertures (44) could be of another complementary and interengageable configuration. For example, a Torx configuration of bolt head may easily be matched by appropriately shaped apertures in ear portions (42).

The ear portions (42) are defined by perpendicular extensions of an elongate interconnecting end bar portion (46) of the lock plate. The end bar portion (46) is for the most also in the plane of the ear portions (42). However, the end bar portion (46) includes a u-shaped central interconnecting segment (48) extending out of the plane of the ear portions (42), viewing particularly FIG. 4. Segment (48) includes a first leg portion (50) and a second leg portion (52), each extending generally perpendicularly from and interconnecting with a respective one of the ear portions (42) via a respective part of the bar portion (46). Segment (48) also includes a resilient bend section (54) interconnecting and spacing apart the legs (50) and (52).

In order to provide for lock plate (36) the desired level of shape retention and strength to resist rotation of fasteners (38), while also allowing a degree of deformation to allow for manufacturing tolerance on the spacing between fasteners 338), the lock plate (36) is formed of shape retaining deformable metal. For example, the applicant has found that mild steel sheet of 18, 20, or 22 gauge will provide all of the strength needed to resist undesired loosening of fasteners (38), while allowing a mechanic to slightly deform the lock plate, for example, by hand or with a pair of pliers to match the spacing of fasteners (38).

The lock plate (36) is secured on the heads of fasteners (38) by a respective spring steel wire lock pin (56). Each pin (56) overlies the respective ear portion (42) to trap the lock plate (36) between the pins (56) and the ear portions (40) of the fuel nozzle (32). The lock pins (56) include a straight portion (58) which passes through a cross-drilling of the head of a bolt (38), and a confronting serpentine portion (60) which engages the external surface of the bolt head to be removably retained therein.

It will be apparent that removal of the lock pins (56) and withdrawal of lock plate (36) from over fasteners (38) allows the latter to be removed, thereby allowing removal of fuel nozzle (32) from casing (30). On the other hand, reversal of the above procedure assures that fasteners (38) are positively locked against inadvertent loosening. Also, the lock plate (36), once matched by an initial installation deformation (if necessary) to match the spacing of fasteners (38), may be reused many times.

Having described my invention in sufficient detail to allow those skilled in the art to make and use it, I desire to protect my invention in accord with the spirit and scope of the appended claims. It will be apparent that modifications to the disclosed embodiment are possible. For example, the disclosed embodiment applies to locking a pair of fasteners. In fact, the invention has application to locking a plurality of fasteners by using a deformably shape-retaining lock plate embodying the invention and having a plurality of respective portions each nonrotatably engaging a respective one of the fasteners, and each portion interconnecting with a next adjacent portion by a deformable section allowing for variable spacing between adjacent fasteners.

What is claimed is:

1. A locking device for securing against undesired loosening relative rotation a plurality of spaced apart threaded fasteners at least two in number each having an outwardly disposed torque-transmission surface and all generally in a planar array, at least two adjacent fasteners of said plurality of fasteners being without line-of-sight relationship therebetween, said locking device comprising a unitary deformably shape-retaining body, said body including a plurality of spaced apart fastener-engaging portions matching in number with and each encompassing a respective torque-transmission surface of one of said plurality of fasteners, each of said plurality of fastener-engaging portions defining cooperating interengageable means for when interengaged with a respective torque-transmission surface of a fastener preventing relative rotation therebetween, a respective connecting portion integral with and extending between each fastener-engaging portion and the next-adjacent fastener-engaging portion of said plurality of portions to prevent relative rotation thereof, the respective connecting portion extending between said two adjacent fasteners extending generally in the plane of said planar array parallel to but spaced laterally from a connecting line between said two adjacent fasteners, each connecting portion including a deformable section deformation of which changes the spacing between said adjacent fastener-engaging portions, and resilient means for removably securing said locking device into interengagement with said plurality of fasteners.

2. The invention of claim 1 wherein said locking device includes each connecting portion extending between said adjacent fastener-engaging portions generally parallel with the plane thereof, each said connecting portion deformable section including a generally u-shaped part of said connecting portion which u-shaped part thereof extends substantially perpendicular to the plane of said locking device.

3. The invention of claim 2 wherein said resilient means comprises a generally u-shaped spring wire clip removably received into a cross hole defined by one of said plurality of threaded fasteners, said spring wire clip trapping said locking device in interengagement with said plurality of fasteners.

4. The invention of claim 1 wherein said locking device is formed of sheet metal.

5. The invention of claim 1 wherein said cooperating interengageable means comprises each one of said plurality of fasteners including a respective head portion having a selected torque-transmitting geometric shape, said plurality of fastener-engaging portions each defining a respective aperture of said selected torque-transmitting shape interengageable with said head portions.

6. A substantially unitary and deformably shape-retaining locking device for securing a plurality of threaded fasteners against inadvertent loosening relative rotation, said plurality of fasteners being generally in a planar array said locking device comprising a plurality of apertured fastener-engaging portions matching in number with said plurality of fasteners and each non-rotatably engaging a respective head portion of one of said plurality of fasteners, a respective deformable interconnecting portion extending between and integrally interconnecting each fastener-engaging portion with the next adjacent one of said plurality of fastener-engaging portions, deformation of said interconnecting portions changing the spacing between said adjacent fastener engaging portions, at least two adjacent fasteners of said plurality of fasteners being without line-of-sight relationship therebetween, the respective connecting portion extending between said two adjacent fasteners extending generally in the plane of said planar array parallel to but spaced laterally from a connecting line between said two adjacent fasteners, and means for removably securing said locking device in engagement with said plurality of fasteners.

7. The invention of claim 6 wherein each of said interconnecting portions includes a generally u-shape deformable central portion extending generally perpendicularly to the plane of said fastener locking device, said u-shape portion including a respective leg part extending perpendicularly from the remainder of said interconnecting portions adjacent respective ones of said fastener-engaging portions, and a bend portion connecting said leg parts.

8. The invention of claim 6 wherein said removable securing means comprises each said fastener head portions defining a respective cross passage therethrough, said locking device engaging said head portions adjacent to said cross passages but spaced from an end of said head portions, and deformably shape retaining spring wire clip member received into said cross passage of each of said fasteners to removably trap said locking device thereon.

9. The invention of claim 6 wherein said locking device is formed of sheet metal.

10. The invention of claim 9 wherein said sheet metal is mild steel of a gauge in the range from 18 to 22.

11. A locking device for assembly onto a pair of spaced apart threaded fasteners having respective heads generally in a plane, and said fastener heads including cross drillings of the type conventionally employed for installation of safety lock wire, said locking device being formed of a single piece of deformably shape-retaining sheet metal and including a central u-shaped deformable portion defining a first bend part of substantially 180 degrees, said first bend part connecting a pair of generally parallel leg portions extending from said first bend part respectively to a pair of oppositely directed bends each of about 90°, respective oppositely extending connecting portions extending generally in said plane of said fasteners from each of said 90° bends to a pair of coplanar fastener-engaging ear portions, said oppositely extending connecting portions being generally mutually parallel and extending parallel to but spaced laterally from a connecting line between said pair of fasteners, each of said fastener-engaging ear portions defining one of a respective pair of fastener head-receiving apertures matching generally the spacing of said pair of fasteners and receivable thereover, deformation of said u-shape deformable portion matching said aperture spacing with said pair of fasteners, and each of said pair of fasteners and said pair of ear portions at said apertures defining cooperating means for interengaging to prevent relative rotation therebetween, and a pair of spring steel wire clips each receivable respectively in a cross drilling of one of said pair of fastener heads to trap said locking device thereon.

12. The invention of claim 11 wherein said single piece of sheet metal is sheet steel of a gauge number in the range from 18 to 22.

13. The invention of claim 11 wherein said pair of fasteners are each of 12-point head configuration, said aperture interengaging cooperating means comprises said ear portions defining at said apertures a polygonal shape having 12 points and 12 reentrant angles and being engageable with said 12-point fastener heads.

* * * * *